April 10, 1928.
M. A. COMEAU
BOLT
Filed May 16, 1927
1,665,875
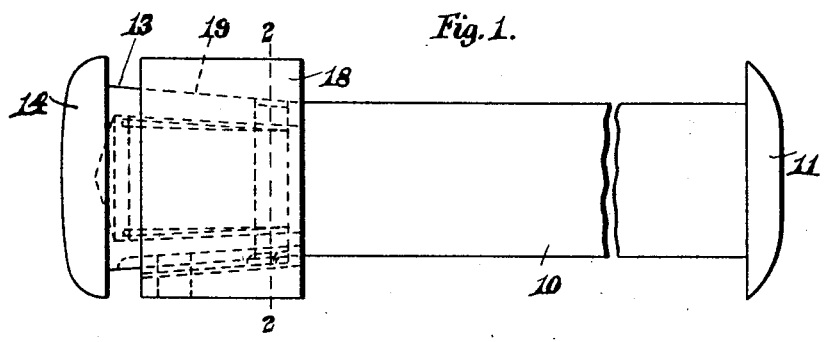
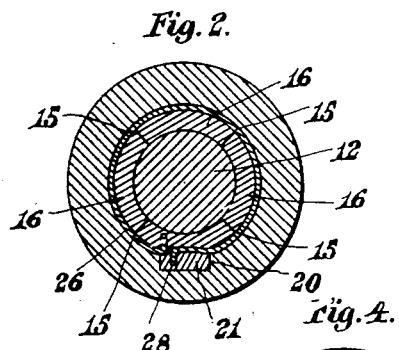
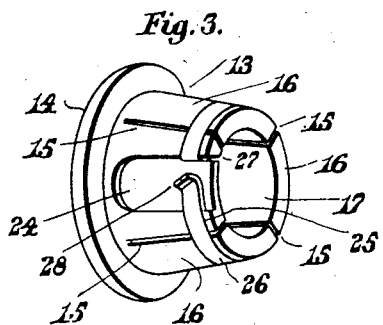
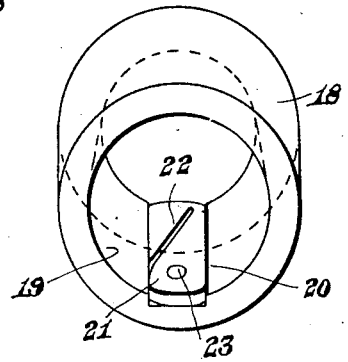
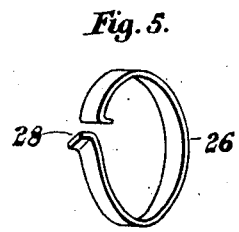
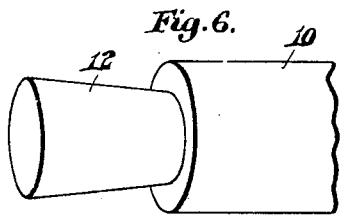
Inventor:
Melburn A. Comeau.
by Walter E. Lombard,
Atty.

Patented Apr. 10, 1928.

1,665,875

UNITED STATES PATENT OFFICE.

MELBURN A. COMEAU, OF HAVERHILL, MASSACHUSETTS.

BOLT.

Application filed May 16, 1927. Serial No. 191,654.

This invention relates to bolts and the nuts therefor, the object being to provide a threadless bolt with a nut adapted to be securely fastened thereto and immovable thereon whereby a member may be firmly clamped between the nut and the head of the bolt without danger of accidental displacement.

This object is attained by the mechanism illustrated in the accompanying drawing. For the purpose of illustrating the invention, one preferred form thereof is illustrated in the drawings, this form having been found to give satisfactory and reliable results, although it is to be understood that the various instrumentalities of which the invention consists can be variously arranged and organized, and the invention is not limited to the precise arrangement and organization of these instrumentalities as herein shown and described except as required by the scope of the appended claims.

Of the drawings:

Figure 1 represents a plan of a bolt and nut embodying the principles of the present invention.

Figure 2 represents a transverse section of same on line 2, 2, on Fig. 1.

Figure 3 represents a perspective of the inner member of the nut.

Figure 4 represents a perspective of the outer member or collar of said nut.

Figure 5 represents a perspective of the locking ring, and

Figure 6 represents a perspective of the nut receiving end of the bolt.

Similar characters indicate like parts throughout the several figures of the drawings.

In the drawings 10 is a bolt having a head 11 at one end and provided at its opposite end with a reduced tapered portion 12, the greatest diameter of which is at its outer extremity.

Over this reduced tapered end 12 is disposed a thimble 13 having a head 14 and a tapered portion having a plurality of slots 15 extending endwise thereof dividing said tapered portion into a plurality of sections 16.

When the sections 16 are spread apart the tapered end 12 may be inserted into the socket 17 of the thimble 13, the side walls of the sections 16 being normally separated as shown in Fig. 3.

Surrounding the bolt 10 and thimble 13 is a collar 18 having a tapered bore 19 adapted to fit the periphery of the tapered portion of thimble 13.

The inner wall of the collar 18 is provided with a groove 20 extending lengthwise thereof in which is disposed a block 21 having an inclined slot 22 extending from one edge thereof as shown in Fig. 4.

The block 21 is secured to the collar 18 by means of the rivet 23.

This block 21 extends inwardly beyond the inner wall of the collar 18 and the projecting portion thereof is positioned in a depression 24 in the periphery of the tapered portion of thimble 13, thereby preventing any rotary movement of said thimble 13 and collar 18 relatively to each other while permitting one of these members to move endwise relatively to the other.

Near the free ends of the sections 16 the peripheral wall of these sections is provided with an annular groove 25 in which is positioned a band 26, one end of which is anchored in a slot 27 while the opposite end has an inclined ear 28 adapted to enter the slot 22.

When the thimble 13 and collar 18 are moved relatively to each other so that the space between the head 14 and the adjacent end of said collar 18 is decreased, the action of the taper in the collar 18 is to close the sections 16 of the thimble 13 onto the tapering end of the bolt, drawing the thimble closer. At the same time, the action of the ear 28 moving along the inclined slot 22 will be to lock the thimble 13.

This bolt and nut constructed as shown and described may be used for a great variety of purposes but is primarily designed for use in connection with motor cars where various elements must be locked securely in position without danger of becoming loosened by the constant jar to which the car is subjected.

When the thimble 13 is thus locked to the tapered end 12 it is impossible to separate them accidentally.

When it is desired to remove the bolt 10 for any reason a tool may be used with a claw end, this claw end being inserted between the head 14 and collar 18 and then actuated in such a manner as to move thimble outwardly from the collar 18.

This operation will permit the band 26 to expand and the sections 16 to spread apart and by so doing the grip of the sections 16 upon the tapered end will be released and the thimble 13 may be removed from the bolt.

This makes a very effective locking bolt, free from threads and which has no nut which may become loosened accidentally and separate from the bolt.

It is believed that the operation and many advantages of the invention will be understood without further description.

Having thus described my invention, I claim—

1. The combination of a bolt having a reduced tapered end of which the greatest diameter is at its outer extremity; a thimble provided with a socket to receive said tapered end, the wall of said socket consisting of a plurality of separated sections; and means surrounding said thimble adapted to force said sections into contact with said tapered end.

2. The combination of a bolt having a reduced tapered end of which the greatest diameter is at its outer extremity; a thimble provided with a socket to receive said tapered end, the wall of said socket consisting of a plurality of separated sections, and a collar surrounding said thimble and movable relatively thereto adapted to force said sections into contact with said tapered end.

3. The combination of a bolt having a reduced tapered end of which the greatest diameter is at its outer extremity; a thimble having a hollow slotted conical portion to receive said tapered end; and a collar fitted to said conical portion and movable endwise thereof to force the sections of said conical portion into contact with said tapered end.

4. The combination of a bolt having a reduced tapered end of which the greatest diameter is at its outer extremity; a thimble having a hollow slotted conical portion to receive said tapered end; and a collar having a conical bore surrounding said conical portion and movable endwise thereof to force the sections of said conical portion into contact with said tapered end.

5. The combination of a bolt having a reduced tapered end of which the greatest diameter is at its outer extremity; a thimble having a hollow slotted conical portion to receive said tapered end with its periphery provided with an annular groove; a band in said groove with one end anchored and the other end provided with an outwardly extending inclined ear; a collar surrounding said thimble and movable endwise relatively thereto; and a block secured to the inner wall of said collar and having an inclined slot to receive the ear of said band.

6. The combination of a bolt having a reduced tapered end of which the greatest diameter is at its outer extremity; a thimble provided with a socket to receive said tapered end, the wall of said socket consisting of a plurality of separated sections; a collar surrounding said thimble and movable endwise thereof; and means interposed between said collar and thimble adapted to be actuated by the end movement of said collar and force said sections into contact with said tapered end.

7. The combination of a bolt having a reduced tapered end of which the greatest diameter is at its outer extremity; a thimble provided with a socket to receive said tapered end, the wall of said socket consisting of a plurality of separated sections; a collar surrounding said thimble and movable relatively thereto adapted to force said sections into contact with said tapered end; a block secured in said collar and having an inclined slot; and a band surrounding said sections anchored at one end to said thimble and having at its other end an ear disposed in said slot.

8. The combination of a bolt having a reduced tapered end of which the greatest diameter is at its outer extremity; a thimble having a hollow slotted conical portion to receive said tapered end; a collar fitted to said conical portion and movable endwise thereof to force the sections of said conical portion into contact with said tapered end; and means between said collar and thimble preventing the rotation of either relatively to the other.

9. The combination of a bolt having a reduced tapered end of which the greatest diameter is at its outer extremity; a thimble having a hollow slotted conical portion to receive said tapered end and having a plurality of separated sections; a collar having a conical bore surrounding said conical portion and movable endwise thereof, said collar being nonrevoluble relatively to said thimble; a member surrounding said conical portion and adapted when contracted to force said sections into contact with said tapered end; and means carried by said collar for contracting said member.

10. The combination of a bolt having a reduced end of which the greatest diameter is at its outer extremity; a thimble having a hollow slotted conical portion to receive said tapered end with its periphery provided with an annular groove; a band in said groove with one end anchored to said thimble and the other end provided with an outwardly extending inclined ear; a collar surrounding said thimble and movable endwise relatively thereto; and a block secured to the inner wall of said collar and having an inclined slot to receive the ear of said band, said block projecting into a groove extending lengthwise of said conical portion.

Signed by me at Haverhill, Massachusetts, this 11th day of May, 1927.

MELBURN A. COMEAU.